O. EULER.
AUTOMOBILE CONTROLLER.
APPLICATION FILED JAN. 26, 1911.
1,025,387.
Patented May 7, 1912.
4 SHEETS—SHEET 1.
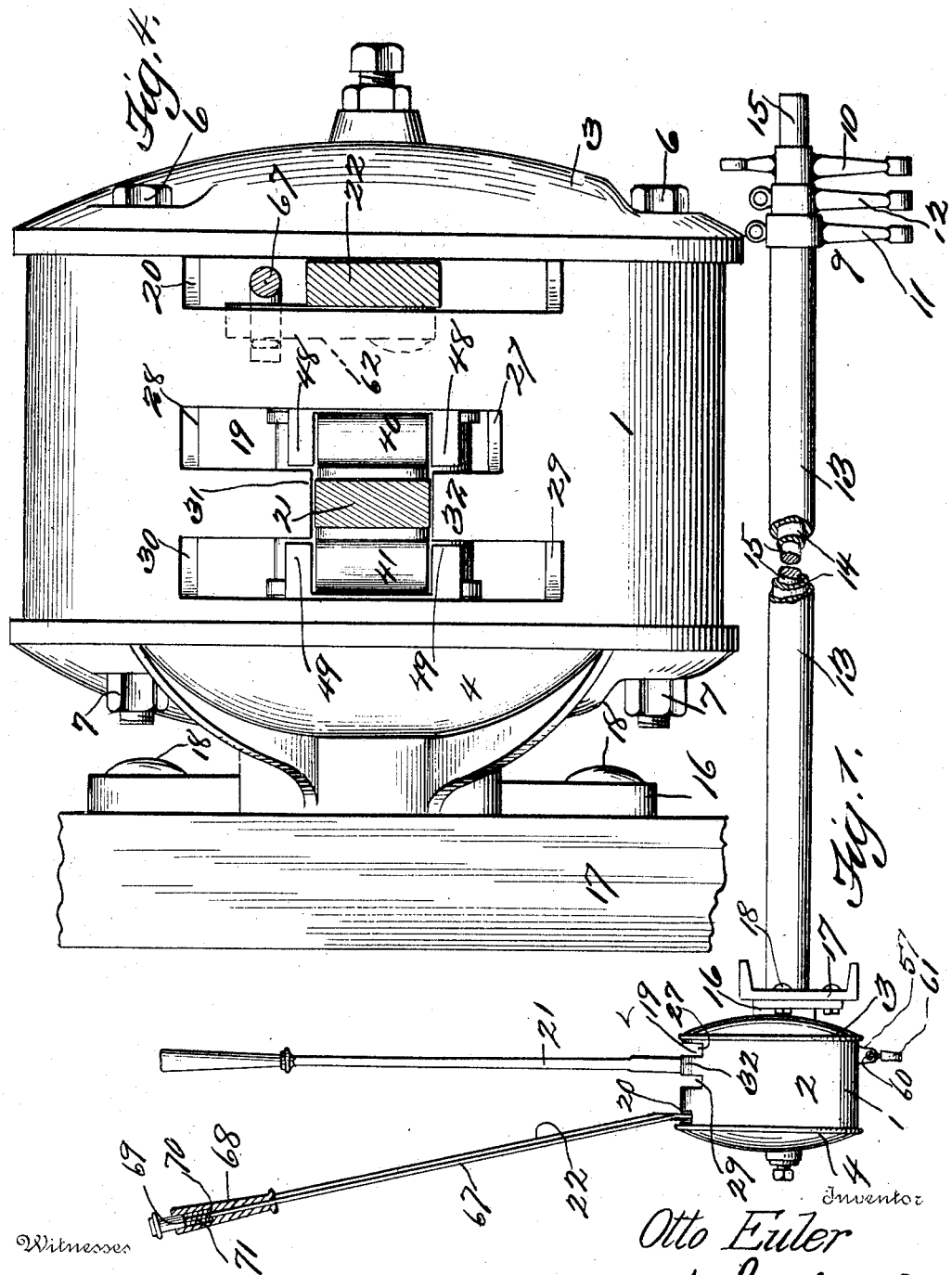
Witnesses
Francis G. Boxwell
R. Bot
Inventor
Otto Euler
By D. Swift &Co.
Attorneys

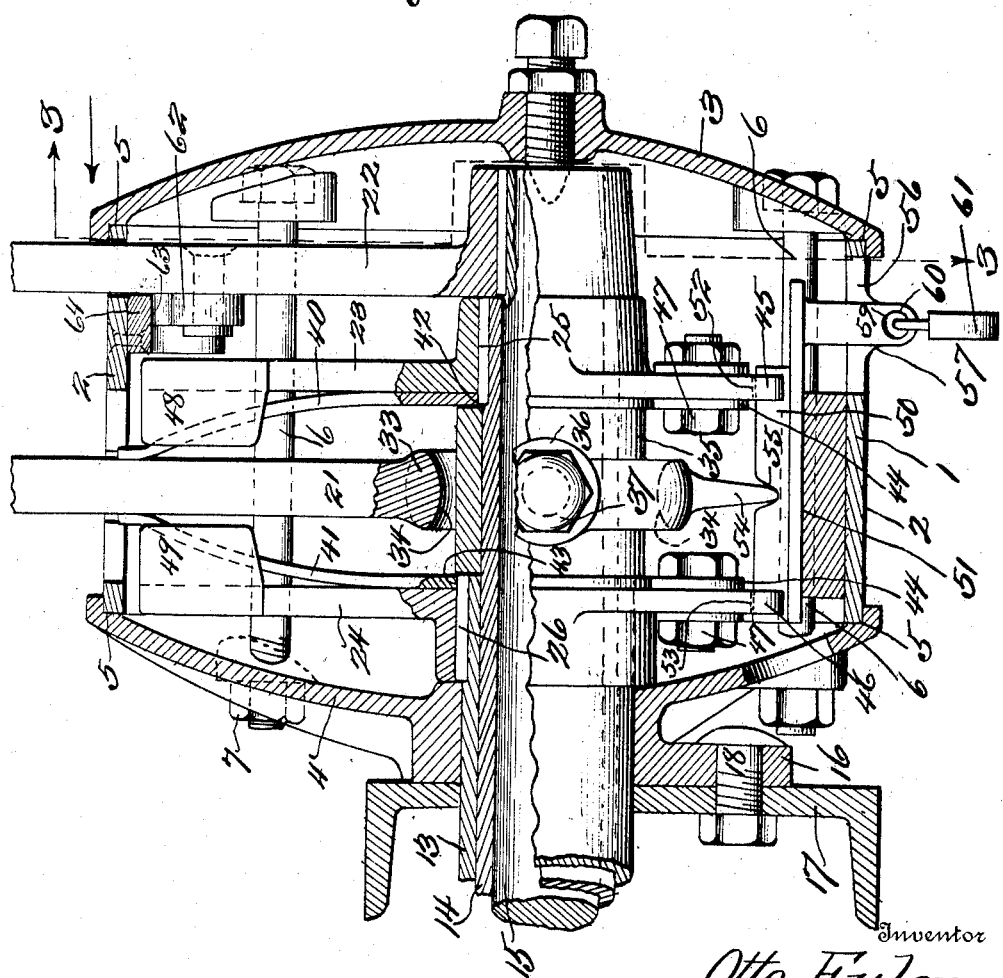

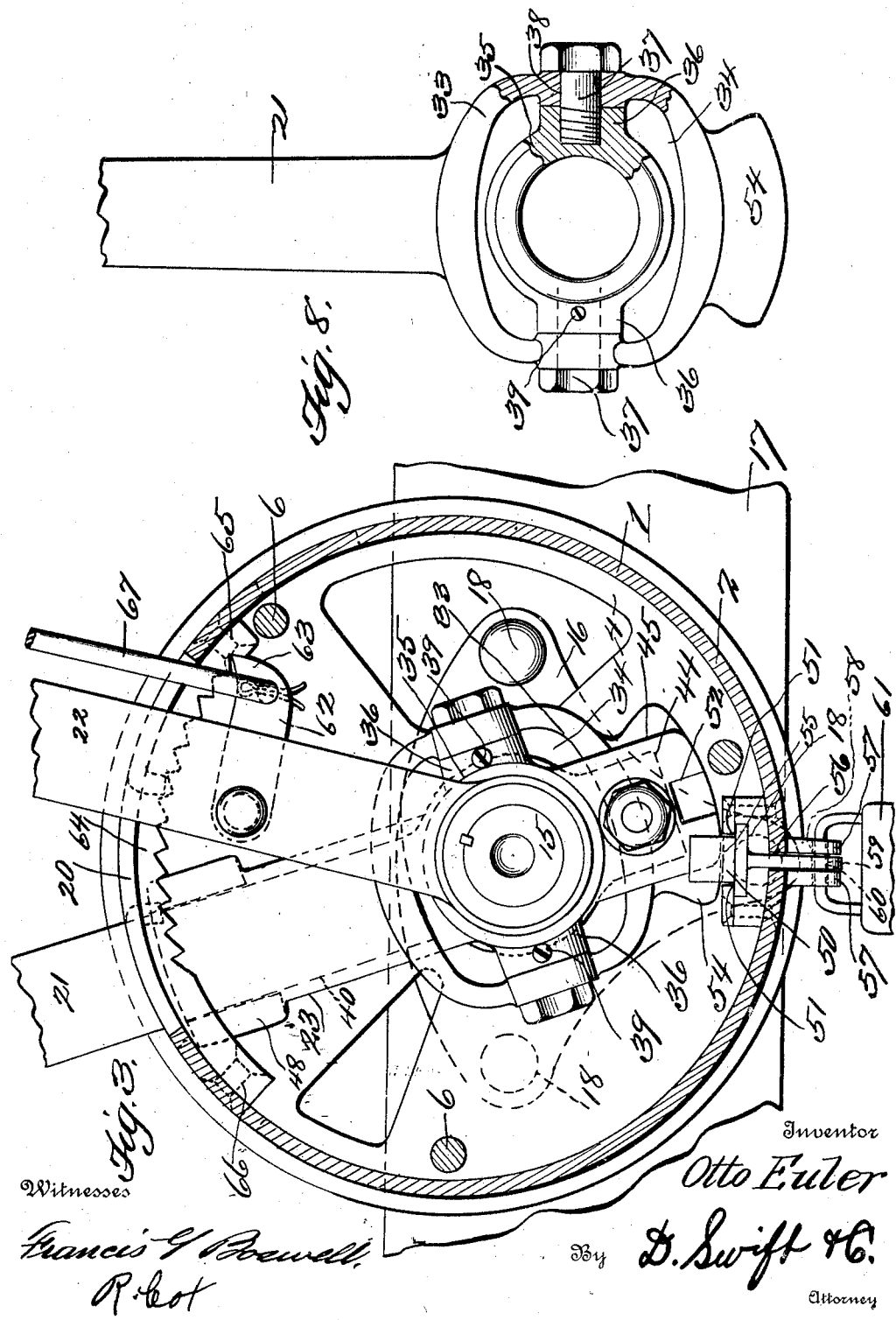

O. EULER.
AUTOMOBILE CONTROLLER.
APPLICATION FILED JAN. 26, 1911.
1,025,387.
Patented May 7, 1912.
4 SHEETS—SHEET 4.
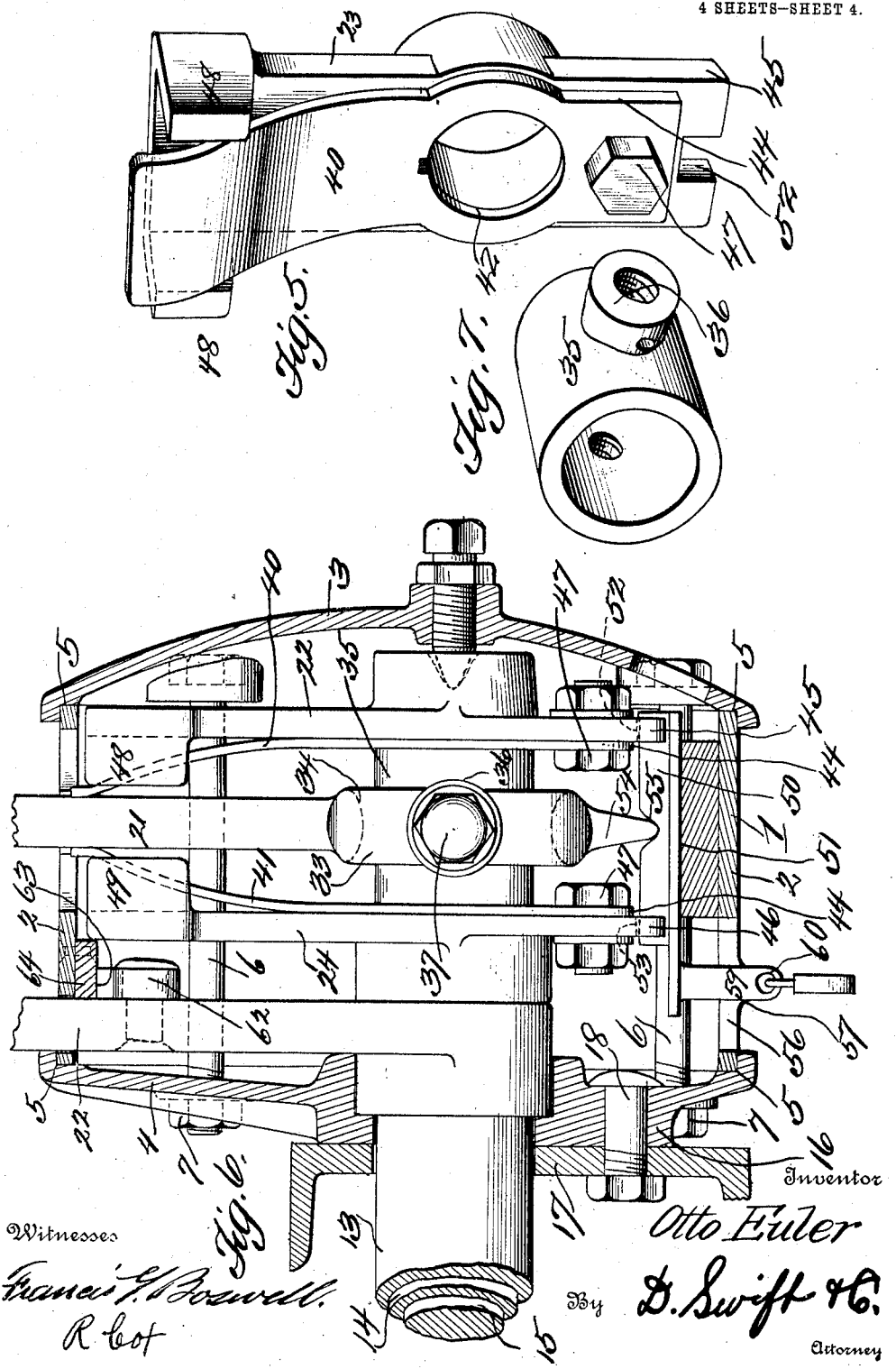
Witnesses
Francis G. Boswell.
R. Cot
Inventor
Otto Euler
By D. Swift &C.
Attorney

UNITED STATES PATENT OFFICE.

OTTO EULER, OF JACKSON, MICHIGAN.

AUTOMOBILE-CONTROLLER.

1,025,387.  Specification of Letters Patent.  Patented May 7, 1912.

Application filed January 26, 1911. Serial No. 604,743.

*To all whom it may concern:*

Be it known that I, OTTO EULER, a citizen of the United States, residing at Jackson, in the county of Jackson and State of Michigan, have invented a new and useful Automobile-Controller; and I do hereby declare the following to be a full, clear, and exact description of the invention, such as will enable others skilled in the art to which it appertains to make and use the same.

The present invention relates to the art of automobiles and it more particularly pertains to a new and useful manually lever shifting mechanisms for controlling a plurality of sublevers (which control the transmission gearing of the automobile), so that any one of the sublevers may be operated for changing the transmission gearing, by a direct movement of a single element, for instance the lever of the shifting mechanism.

The invention in its broadest scope aims as its fundamental object to provide a device of this character, including an interlocking feature, so that neither one of the shifting jaw levers may be operated or shifted, until a sliding bolt is disengaged from one or the other of the jaw levers, by means of a movement of a single lever element, for instance, at right angles to the movements of the jaw levers of the aforesaid mechanism. When the single lever element of the aforesaid lever shifting mechanism is moved at right angles to the movements of the jaw levers, one or the other of the jaw levers is unlocked, and then by shifting the single lever element, in a direction at right angles to its first movement, one or the other of the jaw levers may be operated, which in turn changes the transmission gearing of the automobile.

Another exceedingly important object of the invention, resides in the provision of means, whereby the single lever element of the aforesaid mechanism, may be positively locked in its neutral position, thus insuring the single lever element against movement, for example accidentally, which, it will be observed would unlock one or the other of the jaw levers. This feature of the invention insures the automobiles against theft.

A further object of the invention is to improve the general construction of such mechanisms, and to provide a device of this design, in which there is involved novel features of construction. In the drawings, however, there is only disclosed certain features of construction, but in practical fields these features may necessitate alterations, to which the applicant is entitled, provided the features are comprehended by the appended claims.

The invention includes other features and combination of parts hereinafter set forth, shown in the drawings and claimed.

In the drawings—Figure 1 is a view in side elevation, showing the lever shifting mechanism in conjunction with a plurality of sublevers, which are designed for the purpose of controlling the transmission gearing (not shown) of an automobile. Fig. 2 is a vertical sectional view through the lever shifting mechanism. Fig. 3 is a view partly in section and partly in elevation, taken upon line 3—3 of Fig. 2. Fig. 4 is a plan view partly in section, showing the opening (which includes a plurality of slots or recesses), in which the single lever element operates. Fig. 5 is a perspective view of one of the jaw levers and its spring. Fig. 6 is a view similar to Fig. 2, showing a different arrangement of the vital parts of the mechanism. Fig. 7 is a detail perspective view of the sleeve 35. Fig. 8 is a detail view in elevation of the lower end of the lever 21 showing its connection with the sleeve 35.

Referring more particularly to the drawings accompanying this specification, and in which the preferred forms of this invention are disclosed, 1 designates a casing or drumlike inclosure, which comprises the central annular portion 2, and the end heads or plates 3 and 4. The end heads or plates in some respects are skeleton-like in form, as will be seen in Fig. 3, and are formed with annular recesses 5 which receive the central annular portion 2, in the manner shown in Fig. 2. The end heads are held in place against the annular portion 2, by means of the bolts 6 and the nuts 7.

A plurality of sublevers 9 are disclosed, for controlling the brake mechanism (not shown) and the transmission gearing (not shown). The sublevers include the lever 10 for controlling the brake mechanism and the levers 11 and 12 for controlling the transmission gearing. These levers are embodied in all makes and designs of automobiles, and are only disclosed for the purpose of illustration, so as to demonstrate the operation of the lever shifting mechanism. A plurality of shafts 13, 14 and 15 are provided, which may rotate the sublevers. The lever 10 is carried by and movable with the innermost solid shaft 15, and is utilized for operating the brake mechanism. The lever 12 is movable with and carried by the shaft 14, while the lever 11 moves with the shaft 13. The shafts 13, 14 and 15 are telescopically arranged, and are extended eccentrically into the casing, as shown in Fig. 2, and with which the vital parts of the mechanism coöperate. The head 4 of the casing is formed with an extension or bracket 16, by means of which the casing is secured in position upon a portion 17 of the structure of the automobile. Bolts 18 penetrate the extension or bracket 16 and the portion 17 of the automobile structure.

The annular portion of the casing is formed with two openings 19 and 20. The opening 19 is designed for the purpose of receiving the single control lever element 21, while the opening 20 is utilized for the reception of the lever 22. The lever 22 rotates the shaft 15, which in turn operates the brake mechanism (not shown). The lever 21 is designed for the purpose of rotating either one of the shafts 13 and 14, by coöperating with one or the other of the jaw levers 23 and 24, it being observed that the jaw lever 23 is keyed as at 25 to rotate with the shaft 14, while the jaw lever 24 is keyed at 26 to move with the shaft 13. The opening 19 of the annular portion 2 of the casing is formed with a plurality of offset recesses 27, 28, 29 and 30. When the lever 21 is thrown in engagement with any one of the recesses 27, 28, 29, and 30, the transmission gearing (not shown) is changed, so that the speed of the automobile may be varied. However, when the lever 21 is in a position between the extensions 31 and 32 of the opening 19, as shown in Fig. 2, the same is in a neutral position, and the vital moving parts of the transmission gearing are out of operation. The lower end of the lever 21 is formed with an enlargement 33 with an opening 34 therein. A sleeve 35 is loosely journaled upon the shaft 14, between the jaw levers 23 and 24. The opening 34 of the enlargement 33 is of a diameter very much larger than the diameter of the sleeve 35, as shown in Fig. 3 of the drawings, in order to readily receive the sleeve, so that the lever 21 may be permitted to have movement at right angles to the axis of the sleeve. The sleeve 35, however, at points diametrically opposite one another is formed with threaded bosses 36, which receive the threaded trunnions 37 which are in the form of bolts. These trunnions pass through openings 38 of the enlargement 33 at points diametrically opposite one another. These trunnions constitute fulcrums for the lever 21, so as to permit the lever 21 to be oscillated at right angles to the axis of the sleeve 35, but when the sleeve is rotated upon its axis, the trunnions act as fixed connections between the lever 21 and the sleeve. To lock the trunnions securely in place set screws 39 penetrate laterally through the bosses.

Arranged against the adjacent faces of the jaw levers 23 and 24 are the leaf springs 40 and 41. The spring 40 is formed with an opening 42 sufficiently large to receive the shaft 14, while the spring 41 is provided with an opening 43 large enough to receive the shaft 13, as shown in Fig. 2. The leaf springs 40 and 41 are provided with extensions 44, which are bolted to the lower extensions 45 and 46 of the jaw levers 23 and 24, by means of the bolts 47, so as to move with the jaw levers when oscillated upon their axis. The adjacent faces of the jaw levers at their upper portions are formed with oppositely arranged lugs 48 and 49, between which the upper ends of the leaf springs 40 and 41 are disposed. The springs 40 and 41 are bent toward the lever 21, as shown in Fig. 2. When the lever 21 is oscillated upon its trunnions, in order to assume a position opposite any one of the recesses 27, 28, 29 and 30, either one of the springs 40 and 41 is placed under tension, and is further received between the lugs 48 or 49. When the lever 21 is thus moved the same also enters between either of the lugs 48 or 49, so that the jaw levers 23 and 24 may be permitted to move with the lever 21, when the sleeve 35 is rotated upon its axis by means of the lever 21. When the lever 21 is arranged in engagement with one or the other of the recesses 27, 28, 29 and 30 the speed of the transmission gearing may be changed. However, when the lever 21 is in its neutral position, between the extensions 31 and 32, the jaw levers 23 and 24 are locked in their neutral positions, by means of a sliding member or bolt 50, which is mounted in guides 51. This sliding bolt enters recesses 52 and 53 of the extensions 45 and 46 of the jaw levers, when the lever 21 is in its neutral position. However, when the sliding bolt 50 is shifted in one direction or the other by the lever 21, one end or the other of the sliding bolt is disengaged from one or the other of the recesses 52 or 53. If the lever 21 is oscillated upon its trunnions in direction of the jaw lever 23, one end of the sliding bolt will be removed from the recess 52, which will permit the jaw lever 23 to move upon its axis with the lever 21, when the sleeve 35 is rotated upon its axis, which in turn will partially rotate the shaft 14, thus changing the speed of the transmission gearing, by virtue of the lever 12 of the sublevers 9. By thus moving the lever 21 the same enters either one of the recesses 27 or 28, thereby changing the speed of the transmission gearing to a certain degree. By shifting the lever 21 in the direction of the jaw lever 24, the other end of the sliding bolt is removed from the recess 53 of the extension 46 of the jaw lever 24, thus permitting the jaw lever to move with the lever 21, by virtue of the lugs 49 engaging upon each side of the lever 21. By causing the jaw lever 24 and the lever 21 to move as one body, the shaft 13 is partially rotated, which in turn manipulates the lever 11 of the sublevers 9. This operation changes, to a degree, the speed of the transmission gearing. The sliding bolt 50 is shifted in one direction or the other, through the medium of the permanent engagement between a sector-shaped extension of the lever 21 and the recess 55 of the sliding bolt. The recess 55 is so arranged relatively with regard to the sector-shaped extension 54, as to permit the lever 21 to be oscillated upon its axis at right angles to the axis of the trunnions. In Fig. 2, however, it will be observed that the lower portion of the annular part of the casing is provided with a slot, to one side of the jaw lever 23. Upon each side of this slot 56 an ear 57 is arranged. These ears 57 are perforated as shown at 58, and extend through the slot 56 and between the ears 57 is a lug 59 of the sliding bolt 50. This lug 59 of the sliding bolt is also provided with a perforation 60. When the lever 21 is in its neutral position the perforations 58 and 60 are in registration, which will thus permit a pad-lock 61 to engage the perforations. By the provision of this pad-lock it will be evident that the lever 21 may be positively locked against movement, thus insuring the automobile against theft.

The brake lever 22 within the casing immediately below the upper portion of the casing, as shown in Fig. 3, has pivoted to it a dog 62, the nose 63 of which is designed to engage between any two teeth of the rack-segment 64, shown in Fig. 3. This rack-segment is secured to the casing as at 65 and 66. Pivoted to the dog 62, at a point a short distance from the nose 63 is one end of the rod 67, while the other end of the rod extends centrally through a cylindrical barrel 68 of the lever 22. This rod 67 at its upper portion is formed with a shoulder 69, between which and a flange 70 of the cylindrical barrel 68 a spring 71 is interposed. This spring is designed for the purpose of holding the rod 67 in its uppermost position within the barrel. The spring not only performs this function, but also holds the nose 63 of the dog 62 in engagement between any two teeth of the segment 64, whereby the brake lever 22 may be held in various adjusted positions. When the brake lever 22 is moved in one direction or the other the solid innermost shaft 15 is partially rotated, which in turn operates the lever 10 of the sublevers 9 in one direction or the other, thereby applying the brake mechanism.

In view of the foregoing it will be observed that there has been provided a novel mechanism for controlling a plurality of sublevers, which in turn controls the transmission gearing of the automobile. Furthermore it will be noted that there has been provided a novel interlocking mechanism for locking the jaw levers in their neutral positions, there being included a novel arrangement embodying an attaching device for positively locking the single lever control in its neutral position, thereby insuring the automobile against theft.

It has been found through practical demonstrations that a practical mechanism has been devised, and one which will meet the practical demand in the automobile industry, commercially as well as in a practical manner.

The invention having been set forth, what is claimed as new and useful is:—

1. In a mechanism as set forth; a pair of rocking members; interlocking means therefor; and means capable of oscillatory movements for moving the interlocking means, and then moving one or the other of the rocking members; an inclosure therefor, the interlocking means and the inclosure having registerable members, and an attaching device to engage the registerable members for positively locking the rocking members and the oscillatory means in their neutral positions.

2. In a mechanism as set forth: an inclosure; a pair of rocking members therein; interlocking means therefor; and means capable of oscillatory movements at right angles to one another for moving the interlocking means, and then moving one or the other of the rocking members; and means for maintaining the oscillatory means in its neutral position; the interlocking means and the inclosure having registerable members, and an attaching device to engage the registerable members for positively locking the rocking members and the oscillatory means in their neutral positions.

3. In a controlling mechanism for automobiles, an inclosure, a pair of rocking members therein, an interlocking device therefor having a notch, and a lever having a sector to engage the notch and fulcrumed between the members capable of movements at right angles to the members for actuating the interlocking device, then moving one or the other of the rocking members, the interlocking device having a lug extending through the wall of the inclosure, the inclosure having lugs, one arranged on each side of the first lug, the lugs having registerable apertures, and an attaching device to engage the apertures for positively locking the rocking members and the fulcrumed lever.

4. In a controlling mechanism for automobiles having an inclosure, a pair of rocking members therein, an interlocking device therefor, and a lever fulcrumed between the members capable of movements at right angles to one another for actuating the interlocking device, and then moving one or the other of the rocking members, said interlocking device and the inclosure having registerable members, and an attaching device engageable with the registerable members for locking the rocking members and the lever in their neutral positions.

5. In a controlling mechanism for automobiles having an inclosure, a pair of rocking members therein, an interlocking device therefor, and a lever fulcrumed between the members capable of movements at right angles to one another for actuating the interlocking device, and then moving one or the other of the rocking members, and means interposed between the rocking members upon either side of the lever for maintaining the lever in its neutral position, said interlocking device and the inclosure having registerable members, and an attaching device engageable with the registerable members for locking the rocking members and the lever in their neutral positions.

6. In a controlling mechanism for automobiles, an inclosure including a plurality of telescopically arranged shafts eccentrically penetrable through the inclosure; in combination with a plurality of sublevers for controlling a transmission gearing; a rocking member movable with each of two shafts, an interlocking device for locking the rocking members and provided with a notch, a lever having a sector to engage the notch and arranged between the rocking members to have oscillatory movements at right angles to one another for moving the interlocking device to release the rocking members, and then rocking the rocking members, for moving one or the other of two of the shafts, said interlocking device and the inclosure having registerable members, and an attaching device engageable with the registerable members for locking the rocking members and the lever in their neutral positions.

7. In a controlling mechanism for automobiles, an inclosure including a plurality of telescopically arranged shafts eccentrically penetrable through the inclosure; in combination with a plurality of sublevers for controlling a transmission gearing; a rocking member movable with each of two shafts, an interlocking device for locking the rocking members, a lever arranged between the rocking members to have oscillatory movements at right angles to one another for moving the interlocking device to release the rocking members, and then rocking the rocking members, for moving one or the other of two of the shafts, and means arranged between the rocking members upon either side of the lever for maintaining the lever in its neutral position, the interlocking device including registerable members, and an attaching device engageable with the registerable members for locking the rocking members and the lever in their neutral positions.

8. In a controlling mechanism for automobiles, an inclosure including a plurality of telescopically arranged shafts eccentrically penetrable through the inclosure; in combination with a plurality of sublevers for controlling a transmission gearing; a lever movable with the innermost shaft for controlling the brake lever of the sublevers, the lever for controlling the brake lever having means for holding it in adjusted positions; a rocking member movable with each of the two outer shafts and provided with oppositely arranged lugs at the upper portions, an interlocking device for engaging the lower ends of the rocking members for locking them, a lever fulcrumed upon one of the two shafts and between the rocking members to have oscillatory movements at right angles to one another for moving the interlocking device to release the rocking members, and then to enter between the lugs for rocking the rocking members, thus moving one or the other of two of the shafts, said interlocking device including registerable members, and an attaching device engageable with the registerable members for locking the rocking members and the lever which is capable of oscillatory movements at right angles to one another in their neutral positions.

9. A controlling mechanism for automobiles, an inclosure therefor, a plurality of telescopically arranged shafts, one including means for controlling the brake mechanism, while the other two embody rocking elements for controlling a transmission gearing, a sleeve loosely and rotatably journaled upon one of the other two shafts, an interlocking sliding bolt for locking the rocking members and provided with a notch, a lever fulcrumed to the sleeve for oscillating at right angles to the axis of the sleeve, the lever being so fulcrumed as to rotate the sleeve upon its axis, the lever having a sector to engage the notch for shifting the interlocking sliding bolt when oscillated at right angles to the axis of the sleeve for releasing the rocking members, the rocking members including means to be engaged by the oscillatory lever for enabling one or the other of the rocking members to move with the oscillatory lever, when the sleeve is partially rotated upon its axis, said sliding bolt and the inclosure having registerable members, and an attaching device engageable with the registerable members for holding the oscillatory lever in its neutral position, the rocking members including springs engageable yieldably upon either side of the oscillatory lever for maintaining the oscillatory lever yieldably in its neutral position, when the attaching device is not employed.

In testimony whereof I have signed my name to this specification in the presence of two subscribing witnesses.

OTTO EULER.

Witnesses:
 WESLEY BILLINGS,
 EDWY S. MURPHEY.